April 26, 1960

A. W. GAUBATZ 2,934,296

SUPPORTED BODY WITH VIBRATION ABSORBING
RESILIENT CANTILEVER MOUNT

Filed March 5, 1956

INVENTOR.
Arthur W. Gaubatz
BY
Paul Fitzpatrick
ATTORNEY

United States Patent Office 2,934,296
Patented Apr. 26, 1960

2,934,296

SUPPORTED BODY WITH VIBRATION ABSORBING RESILIENT CANTILEVER MOUNT

Arthur W. Gaubatz, Indianapolis, Ind., assignor to General Motors Corporation, Detroit, Mich., a corporation of Delaware Application March 5, 1956, Serial No. 569,653

2 Claims. (Cl. 248—15)

This invention relates to mounts or supports having resilient characteristics which are particularly adapted for supporting engine accessories or the like on engines which are characterized by relatively high frequency vibration in service. A particular use for which the invention is adapted, and in terms of which it is described in the succeeding specification, is a mount for a speed responsive switch device which is an accessory for a gas turbine aircraft engine.

Such engines include turbines and compressors which ordinarily rotate at high speed. While the rotating structures must be carefully balanced, some vibration is inevitable. Also, the usual gearing which drives the engine accessories may set up gear-tooth vibration of high pitch and significant amplitude. Other vibration sources may give trouble. The prior practice has been to mount the speed switch rigidly on the engine, and it has been found that such vibration adversely affects the operation of the speed switch by causing chatter of the switch contacts and wear of the operating parts.

The present invention involves the interposition of a slightly resilient mount between the engine and the speed switch which serves as a cantilever support for the switch. The mount damps vibration by absorbing energy internally; thus transmission of vibration from the engine to the switch is prevented or minimized. The mount is, however, sufficiently rigid to support the accessory in alignment with the shaft which drives it notwithstanding buffeting of the aircraft or radical maneuvers which put a heavy acceleration load on the mount due to the inertia of the switch.

The principal objects of the invention are to improve the performance of engine accessories and to provide a mount for an engine accessory which is sufficiently rigid to support the accessory but sufficiently resilient to absorb vibrational energy and thus inhibit transmission of vibration from the engine to the accessory.

The nature of the invention and the advantages thereof will be clearly apparent to those skilled in the art from the succeeding description of preferred embodiments of the invention and the accompanying drawings in which.

Figure 1:
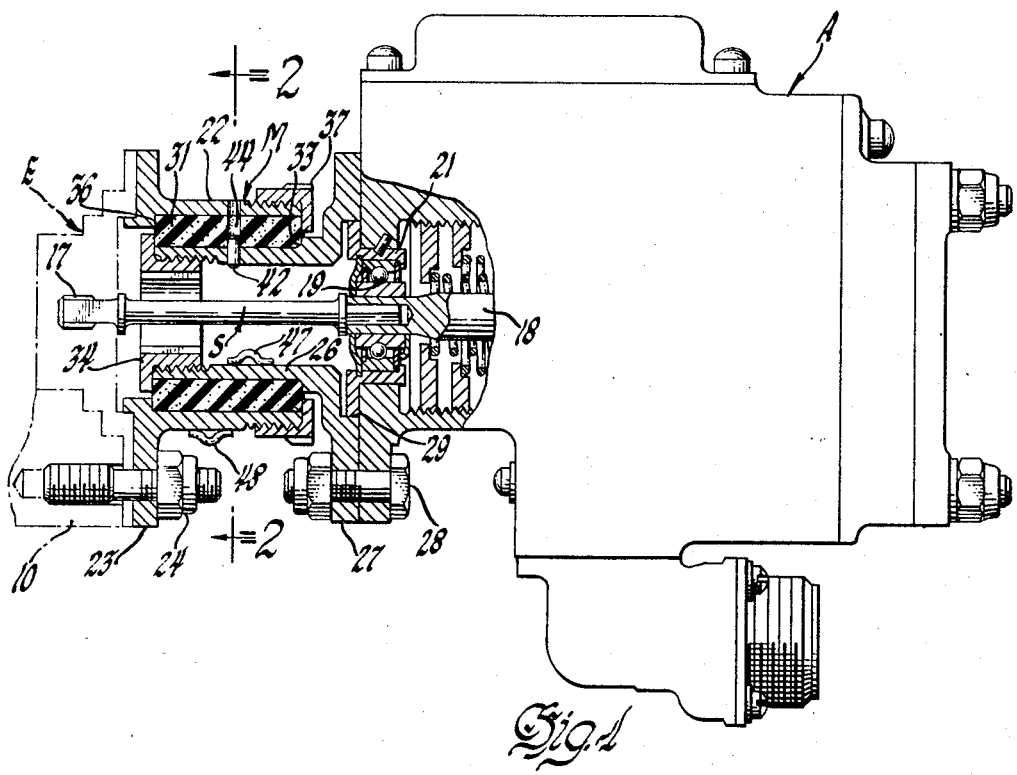
Figure 1 is a view, with parts in section, of a speed switch supported in accordance with the invention on an engine only a fragmentary portion of which is illustrated.
Figure 2:
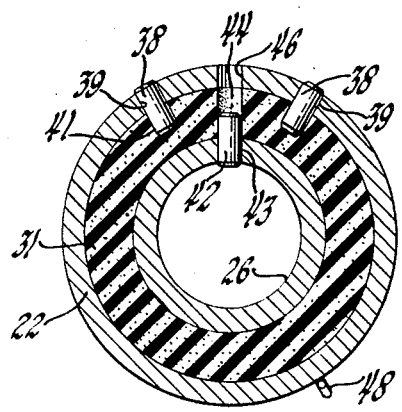
Figure 2 is a transverse sectional view taken on the plane indicated by the line 2—2 in Figure 1.

Figure 1 shows a fragmentary part of an engine E, which may be part of an accessory drive case ordinarily included in such engines, an accessory device A, which specifically may be a speed responsive switch such as that disclosed in the prior application of Arthur W. Gaubatz, Serial No. 352,453 filed May 1, 1953 (Patent No. 2,786,667), a mount M by which the speed switch is supported on the engine, and the coupling shaft S by which the switch is driven. It is to be understood that the internal structure of the engine and the speed switch are immaterial to the invention, which is directed to the connection between them.

The engine includes a case or housing 10 indicated by broken lines within which is a power-driven shaft (not shown) provided with a suitable socket to receive and drive the square end 17 of shaft S. The other end of shaft S, which is hexagonal, is received in a hexagonal hole in the end of the operating shaft 18 of speed switch A, which is supported by bearing 19 mounted in a cage 21.

The mount or coupling M comprises an outer sleeve 22 including a flange 23 piloted on the engine part E and secured by nuts and studs 24. The mount also includes an inner sleeve 26 including a flange 27 fixed to the speed switch by bolts 28. The flange may be recessed as indicated at 29 to pilot over the flange of the bearing cage 21 to align the mount with the speed switch. An intermediate sleeve 31 of resilient material fills the space between the sleeves 22 and 26. This sleeve may be of any suitable resilient material which tends to damp vibration such as a rubber composition containing cotton, of the nature of rubber belting material, rubber hose, or automobile tire carcasses. A suitable material is sold under the trade name "Fabreeka." The intermediate sleeve is in compressive engagement with the interior surface of the outer sleeve and the exterior surface of the inner sleeve. The inner and outer sleeves are locked axially on the intermediate sleeve by a shoulder 33 on the inner sleeve, a nut 34 threaded into the inner sleeve, a shoulder 36 on the outer sleeve, and a nut 37 threaded onto the outer sleeve. The resilient sleeve may be put in slight compression by tightening the nuts on the inner and outer sleeves.

In order to prevent possible rotation of the speed switch about the axis of the shaft S, the intermediate sleeve is non-rotatively coupled or connected to the other two sleeves in any suitable manner. A simple and preferred manner consists in the provision of pins 38 pressed into openings 39 in the outer sleeve and extending into cylindrical pockets 41 in the resilient ring. Pins 38 prevent rotation of the outer sleeve with respect to the intermediate sleeve. A pin 42 pressed into an opening 43 in the inner sleeve through a hole 44 in the resilient sleeve and an opening 46 in the outer sleeve keys the inner sleeve to the intermediate sleeve. It will be apparent that the inner and outer sleeves are out of contact with each other and that the inner sleeve is supported from the outer sleeve only through the resilient sleeve 31. The material of the intermediate sleeve will yield to some extent to vibration and the energy loss due to working of the resilient material by relative vibration of the outer and inner sleeves tends to damp any vibration. Since the resilient material is reasonably stiff and has extended bearing on the outer and inner sleeves, it provides a sufficiently rigid support for the speed switch so that it is held in position and cannot move out of position to any substantial extent because of acceleration loads resulting from maneuvers of an aircraft in which the device may be mounted.

Suitable means may be provided to prevent loosening of the nuts 34 and 37 because of vibration. As shown, a small wire loop 47 is welded to the inner surface of sleeve 26 and a similar loop 48 is welded to the outer surface of sleeve 22. The nuts 37 and 34 may be provided, as is customary, with holes (not shown) for lockwires which may be secured to the wire loops or clips 47 and 48.

It will be apparent to those skilled in the art from the foregoing description that while the amount illustrated is simple, the structure is very well adapted to provide a reasonably structurally stiff mount for the accessory device but one which will prevent the transmission of destructive vibrations from the engine to the accessory device.

The detailed description of the invention for the purpose of explaining the principles thereof is not to be construed as limiting or restricting the invention, as many modifications may be made within the scope of the invention by the exercise of skill in the art.

I claim:

1. In combination, a supporting body characterized by high-frequency vibration and by significant acceleration; a supported device mounted on the supporting body; and a single vibrational energy absorbing resilient cantilever mount constituting the sole structural support for the device connecting the device to the body, the mount comprising an outer cylindrical sleeve and an inner cylindrical sleeve substantially coaxial with the outer sleeve, an intermediate sleeve of vibration-damping resilient material mounted between and engaging the outer and inner sleeves, each of the inner and outer sleeves having abutments thereon engaging the ends of the intermediate sleeve, the outer and inner sleeves being out of contact with each other, the intermediate sleeve being composed of a dense firm material and having substantially greater length than thickness and having extended continuous bearing surfaces against the outer and inner sleeves so that it opposes substantial resistance to departure of the outer and inner sleeves from coaxial relation resulting from acceleration of the body transverse to the axis of the sleeves, means coupling one sleeve to the said body, and means coupling the other sleeve to the said device.

2. In combination, a supporting body characterized by high-frequency vibration and by significant acceleration; a supported device mounted on the supporting body; and a single vibrational energy absorbing resilient cantilever mount constituting the sole structural support for the device connecting the device to the body, the mount comprising an outer cylindrical sleeve and an inner cylindrical sleeve substantially coaxial with the outer sleeve, an intermediate sleeve of resilient vibration-damping material mounted between and engaging the outer and inner sleeves, each of the inner and outer sleeves having abutments thereon relatively movable, and adjusted to put the intermediate sleeve under compression, engaging the ends of the intermediate sleeve, the outer and inner sleeves being out of contact with each other, the intermediate sleeve being composed of a dense firm material and having substantially greater length than thickness and having extended continuous bearing surfaces against the outer and inner sleeves so that it opposes substantial resistance to departure of the outer and inner sleeves from coaxial relation resulting from acceleration of the body transverse to the axis of the sleeves, means coupling one sleeve to the said body, and means coupling the other sleeve to the said device.

References Cited in the file of this patent

UNITED STATES PATENTS

| | | |
|---|---|---|
| 475,311 | Hart | May 24, 1892 |
| 2,144,848 | Miller | Jan. 24, 1939 |
| 2,349,215 | Wahlborg | May 16, 1944 |
| 2,421,529 | Tyler | June 3, 1947 |
| 2,750,137 | Cunningham | June 12, 1956 |